March 4, 1924.
W. H. GARTLEY ET AL
AUTOMATIC CONTROL WATER GAS SET
1,485,845
Filed Aug. 15, 1921    2 Sheets-Sheet 1
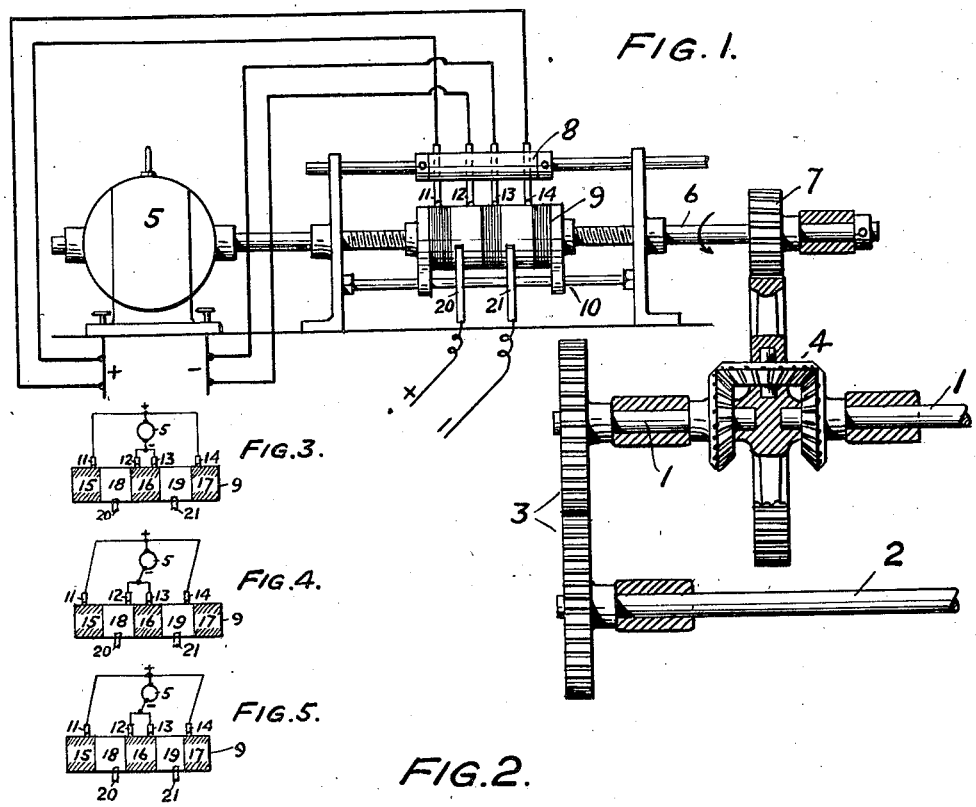
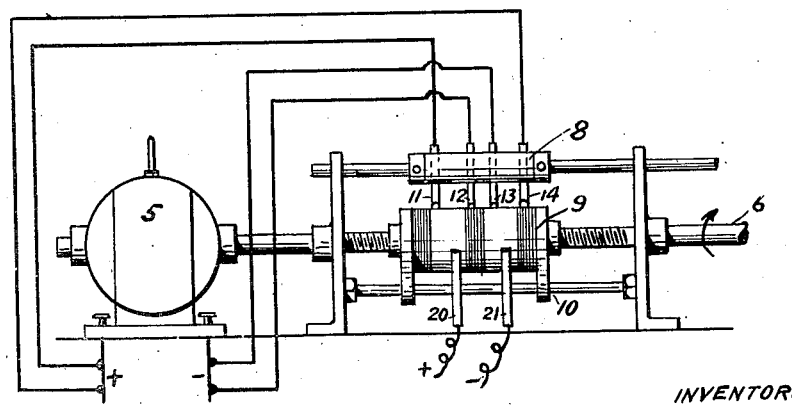
WITNESS:
INVENTORS
William H. Gartley and
Owen B. Evans
BY
ATTORNEY.

March 4, 1924.
W. H. GARTLEY ET AL
1,485,845
AUTOMATIC CONTROL WATER GAS SET
Filed Aug. 15, 1921  2 Sheets-Sheet 2
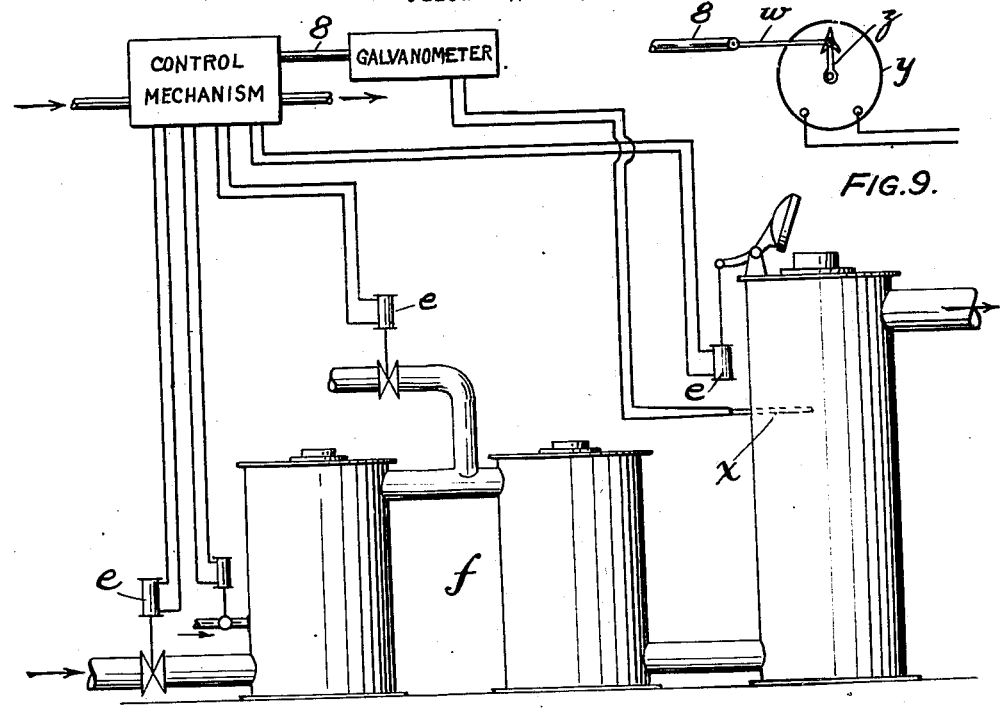
FIG.9.
FIG.6.
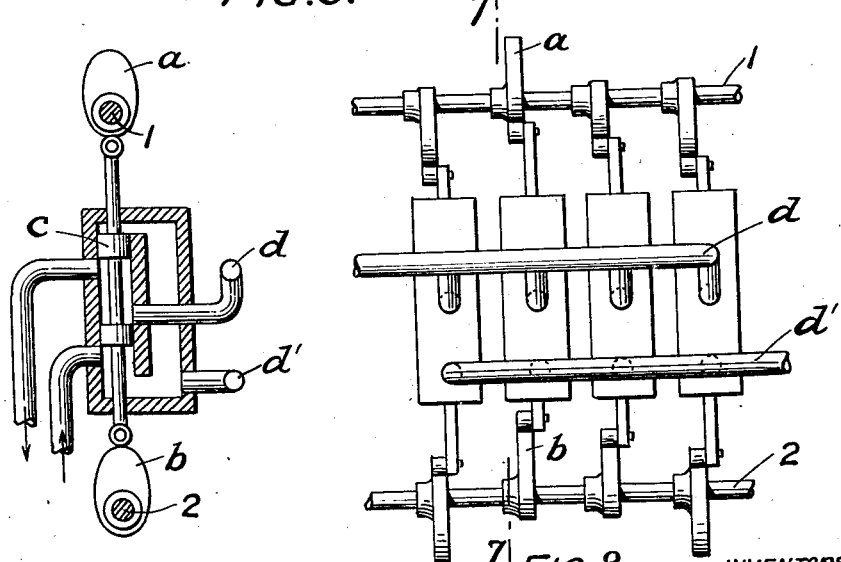
FIG.7.
FIG.8.
WITNESS:
Robt R Kitchel
INVENTORS
William H. Gartley and
Owen Brooke Evans
BY
Augustus B Stoughton
ATTORNEY.

Patented Mar. 4, 1924.

1,485,845

UNITED STATES PATENT OFFICE.

WILLIAM H. GARTLEY AND OWEN B. EVANS, OF PHILADELPHIA, PENNSYLVANIA, ASSIGNORS TO THE U. G. I. CONTRACTING COMPANY, OF PHILADELPHIA, PENNSYLVANIA, A CORPORATION OF DELAWARE.

AUTOMATIC-CONTROL WATER-GAS SET.

Application filed August 15, 1921. Serial No. 492,603.

*To all whom it may concern:*

Be it known that we, WILLIAM H. GARTLEY and OWEN B. EVANS, citizens of the United States, residing at Philadelpha, in the county of Philadelphia and State of Pennsylvania, have jointly invented a new and useful Improvement in Automatic-Control Water-Gas Sets, of which the following is a specification.

Automatic control water gas sets are known and are in use and are described, for example, in Letters Patent No. 1,119,472, dated December 1st, 1914, and they are characterized by time driven cams of which some operate to end the run and start the blow, and of which others operate to end the blow and start the run, and in consequence of this the succeeding blows and the succeeding runs are of the same relative duration regardless of heat or temperature conditions of the apparatus.

The principal object of the present invention is to improve the operation of automatic control water gas sets by varying the relative duration of succeeding runs and blows in response to variations of heat or temperature conditions in the apparatus so that the latter are automatically made appropriate for the accomplishment of the best results in the gas making operation.

To this and other ends hereinafter stated, the invention comprises the combination in an automatic control water gas set having run and blast control mechanisms of means for changing the timing of said mechanisms and thermally responsive provisions adapted to co-operate with said means, or to control or to actuate the latter.

The invention further comprises the improvements to be presently described and finally claimed.

The invention will be explained in connection with the embodiment of it chosen from other embodiments for the sake of illustration in the accompanying drawings forming part hereof and in which—

Figure 1 is a more or less diagrammatic view, partly in elevation and partly in section, illustrating features of the invention.

Fig. 2 is a similar view illustrating a portion of the apparatus shown in Figure 1, with a part thereof in a different position.

Figs. 3, 4, and 5 are diagrammatic views illustrating circuit connections for different positions of the controller elements.

Fig. 6 is a diagrammatic and schematic view illustrating a water gas set embodying features of the invention.

Fig. 7 is a sectional view taken on the line 7—7 of Fig. 8.

Fig. 8 is a view of a device for operating the valves of a water gas set, and

Fig. 9 is a diagrammatic or schematic view illustrating the pyrometer connections.

In the drawings 1 and 2 may be called the run and blow or blast control shafts which are geared together as at 3 and of which one is positively driven usually at a substantially constant speed. These shafts 1 and 2 operate the cams $a$ which end the blow and initiate the run and also the cams $b$ which end the run and initiate the blow, the cycle of run and blow being completed at each revolution of the shafts, so that their angular relation determines the relative duration of succeeding blows and runs. The cams $a$ and $b$, by shifting the slide valves $c$, cause motive fluid, supplied at $d$ and exhausted at $d^1$, to bring about complete strokes of the pistons of the cylinders $e$, connected with the run and blast, or apparatus valves of the water gas set or apparatus $f$ and operative to move and to place them in "on" and "off" positions. It may be said that if some valves are put into extreme position by cams $a$ and some valves are put into extreme position by cams $b$, at each revolution of the same, then the time in one revolution at which this will occur is changed by changing the angular relation of the cams, i. e., by advancing or retracting them in respect to circular degrees. If the cams are set 180° apart, the time interval or cycle of one revolution is divided equally and if they are 270° apart the time cycle is divided as 3 to 4. There is nothing new about these shafts and their function and equivalents for them are known and they are referred to herein as an illustration of mechanism, the timing relation of parts of which is, according to our invention, changed in response to the heat or temperature of the gas apparatus in order to increase or diminish the relative duration of succeeding runs or blows or to permit the relative duration of succeeding runs or blows to remain constant according to heat conditions of the apparatus and in order to produce gas under appropriate conditions. 4 is planet-gearing interposed in the shaft 1 and which ordinarily permits the two parts of the shaft 1 to run at the same speed but which when actuated changes the angular relation of the two parts of the shaft 1 to the extent that it is actuated and thereafter permits the two parts of the shaft 1 to run at the same speed which is the speed of the shaft 2 so that ordinarily the righthand part of the shaft 1 and the shaft 2 run at the same speed and in fixed angular relation, but by actuating the planet-gearing the angular relation between the righthand part of the shaft 1 and the shaft 2 can be changed while they continue to run at the same speed. 5 is an electric motor of which the driven shaft 6 is geared to the planet-gearing 4 by a toothed wheel 7, and the motor 5 serves to operate the planet-gearing to change the angular relation or timing of the parts which control the relative duration of succeeding runs and blows as has been described. The controller for the motor includes two movable elements of which one 8 is responsive to a pyrometer or like instrument not shown but which is arranged to respond to temperature changes at that part of the set in response to which temperature changes the mechanism of this invention is intended to operate. The other movable element 9 is a nut having threaded engagement with the shaft 6 and held against rotation by the slide 10. The bar 8 is provided with contacts 11, 12, 13, and 14, and the nut 9 is provided with insulating portions 15, 16, and 17 and with current carrying portions 18 and 19. The contacts 11 and 14 are connected to one pole which may be called the positive pole of the motor 5 by means of leads correspondingly numbered, and the contacts 12 and 13 are connected to the other pole of the motor 5 which may be called the negative pole by leads which are correspondingly numbered.

When the automatic control water gas set is operating under time control, as indicated, the planet-gearing is at rest and the relative lengths of the succeeding blows and runs is determined by the speed of revolution of the shafts 1 and 2, and the contacts 11, 12, 13, and 14 rest upon the insulations 15, 16, and 17, Figs. 3 or 5, so that the motor is at rest although current is supplied to the conducting sections 18 and 19 by contacts 20 and 21 connected by leads correspondingly numbered with a source of current not shown. A change of temperature, for example, a rise in temperature in the set causes the pyrometer to shift the bar 8 toward the left from the position in Fig. 3 into the position indicated in Fig. 4. The result of this is that a current path is established which may be traced as from 20 through 18 by 12 through the motor 5 by 14 through 19 to 21. Current flowing through this path may be said to pass through the motor in the direction which may be indicated in connection with the foregoing description as from the pole marked negative to the pole marked positive. In consequence of this the motor runs in one direction and in doing so operates the planet-gearing 4 changing the angular relation of the run and blast shafts. As has been said this change of angular relation increases the relative duration of the run in response to the blow causing the temperature in the set to fall. The described operation of the motor gradually shifts the nut 9 toward the left, Fig. 5, which brings the contact 11 on the insulation 15, the contacts 12 and 13 on the insulation 16, and the contact 14 on the insulation 17, so that the motor comes to rest and the shafts 1 and 2, that is the run and blast shafts, continue to operate in the same angular relation. A further rise in temperature in the set results in a repetition of the described operation of the controlling elements 8 and 9 so that no particular description of it is required. Evidently a fall in temperature would result in movement of the bar 8 toward the right in Fig. 3 establishing a circuit path which may be traced from 20, 18, 11, through motor 5 in the direction from the positive to the negative pole by 13, 19 to 21, thus current is supplied to the motor in a direction the reverse of the direction above described so that the motor runs in the opposite direction and actuates the various parts to which reference has been above made in the way described but in the other direction with results that will be readily understood and include a lengthening of the blows in respect to the runs bringing about an increase in temperature of the set.

The hot end of the pyrometer $x$, being suitably located in the set the movable element of the galvanometer $y$ of the pyrometer is connected to actuate the bar 8 in the manner described, as shown the connection is a direct one through a crank arm $z$ and link $w$, but those skilled in the art will understand that in practice a relay should be included in the connection.

It will be obvious to those skilled in the art to which the invention relates that modifications may be made in details of construction and arrangement without departing from the spirit of the invention which is not limited as to those matters or otherwise than as the prior art and the appended claims may require.

We claim:

1. In automatic control water gas sets the combination with the run and blast control mechanisms of means for changing the timing relation of said mechanisms, and thermally responsive provisions adapted to coact with said means, substantially as described.

2. In automatic control water gas sets the combination with the run and blast control mechanisms of means for changing the timing relation of said mechanisms and including a device for automatically arresting said means upon the completion of a definite cycle of operation, and thermally responsive provisions adapted to coact with said means, substantially as described.

3. In automatic control water gas sets the combination with the run and blast control shafts of means for changing the circular degree relation of said shafts, and thermally responsive mechanism adapted to coact with said means.

4. In automatic control water gas sets the combination with the run and blast control shafts of means for effecting and limiting changes in the circular degree relation of said shafts, and thermally responsive mechanism adapted to coact with said means.

5. In automatic control water gas sets the combination with the run and blast control shafts of planet-gearing for changing the circular degree relation of the shafts, a motor for actuating said planet-gearing, a controller for the motor, and a thermally responsive element for operating the controller.

6. In automatic control water gas sets the combination with the run and blast control shafts of planet-gearing for changing the circular degree relation of the shafts, a motor having an over-running limit device and adapted to actuate said planet-gearing, a controller for the motor, and a thermally responsive element for operating the controller.

7. In automatic control water gas sets the combination with the run and blast control shafts of planet-gearing for changing the circular degree relation of said shafts, an electric motor for actuating the planet-gearing, and a controller for the motor consisting of co-operating parts of which one is responsive to temperature changes and of which the other is responsive to motor operation, substantially as described.

8. In automatic control water gas sets the combination with the run and blast shafts of planet-gearing for changing the circular degree relation of the shafts, an electric motor provided with a driving shaft geared to said planet-gearing, circuit connections for the motor, a movable bar responsive to temperature changes, a nut arranged to travel with the driving shaft and provided with current carrying and insulating contacts, and contacts on the bar co-operating with the contacts on the nut, substantially as described.

9. In combination, water gas apparatus, timing mechanism adapted to put apparatus valves into open and into closed positions, and thermally responsive provisions adapted to change the timing mechanism.

10. The combination in water gas apparatus of mechanism for opening and closing apparatus valves during portions of a cycle, and thermally responsive means adapted to control the portions of the cycle at which the respective valves are in open and in closed positions.

WILLIAM H. GARTLEY.
OWEN B. EVANS.